Jan. 22, 1952  L. A. MAAS  2,583,382
BEARING ASSEMBLY
Filed May 11, 1949

INVENTOR:
LEONHARD A. MAAS
BY
*Albert Sperry*
ATTORNEY

Patented Jan. 22, 1952

2,583,382

UNITED STATES PATENT OFFICE 2,583,382

BEARING ASSEMBLY

Leonhard A. Maas, Trenton, N. J., assignor to The Smith Bearing Company, Inc., Orange, N. J., a corporation of New Jersey Application May 11, 1949, Serial No. 92,709

2 Claims. (Cl. 308—72)

This invention relates to bearing assemblies and is particularly concerned with the mounting and support of a self aligning bearing member. While the invention is particularly designed for use with needle type roller bearings it will be understood that the invention is in no way limited to such type of bearing. Other types of roller or ball bearings may be employed in carrying out the primary inventive concept and the invention is equally applicable to the mounting and support of plain bearings.

Self aligning bearings of the type to which the present invention relates are characterized by the provision of a bearing unit having an outer bearing race with an external spherical surface. The unit is generally mounted between spaced retainers having conforming internally facing spherical surfaces which permit at least limited universal movement of the bearing unit to insure self alignment of the bearing unit with a shaft or like element.

Retention of the outer bearing race of the unit against movement in the direction of the axis of the shaft has been effected heretofore by the use of spaced removable retainer rings or annular shims supported in a bearing housing and presenting inwardly facing spherical surfaces. Multiplicity of parts is one of the inherent objections to such an assembly. Each ring must be radially adjustable and must include suitable securing means for retaining it in adjusted position. The time and cost of assembly is of course proportionate to the number of parts. Such assemblies also require considerable machining and finishing of parts, since the interfitting and securing of parts requires an accuracy beyond the tolerances achieved by usual casting procedures.

It is among the primary objects of the present invention to provide a bearing assembly, for self aligning bearings of the type set forth, having a minimum number of parts and one so constructed and arranged as to provide greater ease and simplicity of assembly, both as to the parts of the bearing support and as to the assembly of the bearing unit within the support.

Another object of the invention is to provide a bearing assembly embodying parts which may be formed in finished condition by casting without requiring any machining or finishing operations. In carrying out this objective the present invention provides for a minimum of machining or finishing operations of other associated parts of the complete assembly.

Other objects of the invention include that of providing a bearing assembly which may be readily adjusted after assembly to compensate for wear and to permit realignment of the bearing unit. The same ease of adjustment also permits facility in disassembly for inspection or substitution of the bearing unit.

Numerous other objects and features of the present invention will be apparent from the following specification taken in connection with the accompanying drawing.

In general terms the invention may be described as comprising a bearing assembly including a housing member and a pair of removable and adjustably mounted semi-circular bearing engaging members carried by said housing and having complementary inner spherical faces adapted to receive and retain therebetween the similarly formed outer spherical face of a self aligning bearing unit.

Figure 4:
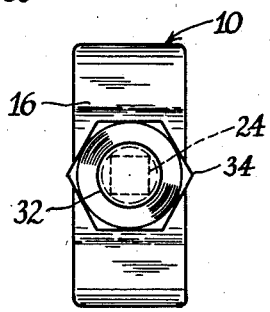
Fig. 4 is an end elevation of the bearing assembly of Fig. 1.

The bearing housing of the present assembly is indicated by the numeral 10 and preferably comprises a casting having a body portion 12 with a relatively thick terminal end 14 and an elongated neck 16. The body portion 12 is provided with a transverse circular bore 18 formed with a central intermediate annular recess 20 forming opposite annular shoulders 22 on either side of the recess 20. Centrally of the terminal end 14 the recess 20 is provided with a guide seat 24 comprising a depression extending axially of the housing. The seat 24 is preferably of angular transverse cross section, here shown as rectangular as seen by the dotted lines of Fig. 4. In axial alignment with the seat 24 the neck 16 is provided with an internally threaded centrally disposed bore 26 the axis of which is in a plane normal to the plane of the bore 18 of the body portion 12.

The retainers for the bearing member comprise arcuate stirrups 28 removably mounted within the recess 20 of the bore 18. In the preferred form of the invention here shown the stirrups 28 are substantially semicircular and are formed as identical elements so that a pair of such stirrups mounted within the recess 20 between the shoulders 22 will engage the opposite sides of a bearing to retain such bearing in position. Each arcuate stirrup 28 is of greater radial thickness than the depth of the recess 20 and of transverse width equal to the width of the recess. The stirrups therefore fit snugly within the recess 20 and are held against axial movement with respect to the housing 12. At the same time the inner faces 29 of each stirrup extend into the bore 18 beyond the inner peripheral edges of the shoulders 22 on the house 12. The inner or concave face 29 of each stirrup is circular in both axial and radial directions and the curvature is preferably such that each face defines a portion of a spherical surface. In the final adjustment of the assembly the stirrups are so located as to space the internal faces 29 so that they lie in the same spherical surface, thus to form in combination opposite segments of a spherical annulus.

Each of the stirrups 28 is further formed with an externally protruding boss 30 formed of a depth and cross section conforming to that of the seats 24. The boss of the outermost stirrup 28 is mounted within the seat 24 to retain the stirrup against rotational movement in the housing while the boss 30 of the opposite stirrup is located within the bore 26 of the neck 16. The latter stirrup is engaged by the inner end of the externally threaded securing bolt 32 aujustably mounted within the bore 16 of the body 12. A lock nut 34 is provided for the bolt 32 to assist in retaining the bolt in adjusted position.

The bearing unit here selected as illustrative of the type of bearing unit used in the assembly comprises an outer race 36 presenting an inner surface 38 engaged by needle bearings 40. It will be understood that the invention is not concerned with the precise form of the bearing unit and that the unit here shown is merely illustrative. The bearing unit is of the self aligning type and as characteristic of such type of unit the outer surface 42 of the race 36 is formed as an annular fragment of a sphere. The curvature of the outer surface of the outer race 38 is substantially in conformity with the inner configuration of the surfaces 29 of the stirrups 28 so that when the bearing is assembled and retained within the housing the stirrups will engage and embrace opposite sides of the race and thus retain the bearing unit against movement in the direction of its axis and the axis of the bore of the housing. As indicated at 44 the inner faces of the stirrups may be grooved to provide for lubrication if desired.

In the use of the present invention it will be seen that the stirrups 28 may be readily assembled within the housing by outwardly adjusting the bolt 32 and slipping any selected pair of identical stirrups within the recess 20 between the shoulders 22. The boss 30 of one of the stirrups is located within the seat 24 while the boss 30 of the opposite stirrup is located within the bore 26 of the neck 16. It will be understood of course that the diameter of the bore 18 exceeds the diameter of the bearing unit so as to permit the stirrups to be located within the housing with a spacing permitting the bearing to be freely inserted between the stirrups. In this connection it will be noted that the radius of curvature of the recess 20 and the conforming outer curvature of the stirrups differs from the radius of the outer face of the bearing and the conforming curvature of the inner face of the stirrups by a distance exceeding the thickness of the stirrups. Therefore when the stirrups are adjusted inwardly towards the bearing their inner surfaces will snugly embrace the bearing. It will also be understood that the extent of the shoulders 22 inwardly from the recess will be sufficient to accommodate any such inward adjustment of the stirrups without permitting their dislodgment from the recess and that the relation of depth of seat 24 and length boss 30 is likewise sufficient to preclude movement of the head from the seat as a result of such adjustment.

Figure 1:
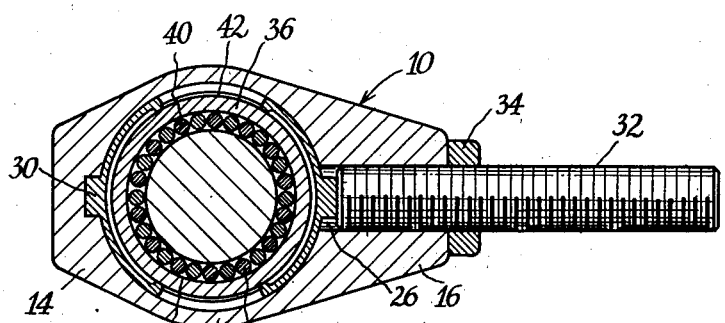
Fig. 1 is a section through a typical bearing assembly formed in accordance with the present invention, taken on a plane normal to the axis of the bearing unit.
Figure 2:
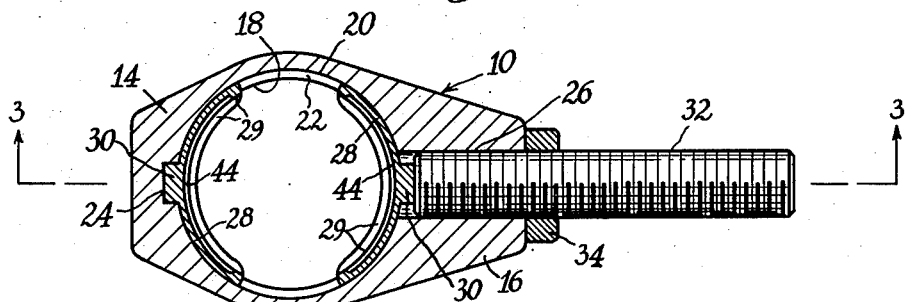
Fig. 2 is a section similar to that shown in Fig. 1 with the bearing unit removed.
Figure 3:
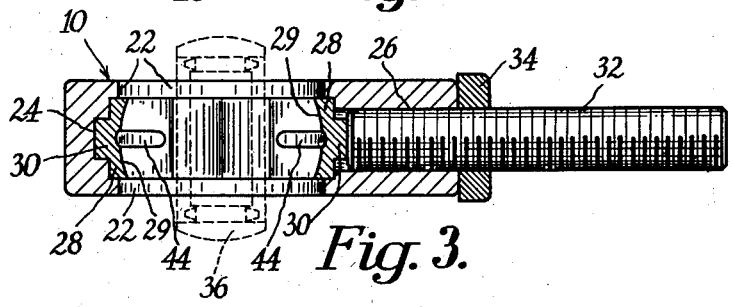
Fig. 3 is a section taken on line 3—3 of Fig. 2.

With the stirrups located in the manner indicated and with the bolt withdrawn the bearing unit is inserted between the stirrups preferably by turning the unit to the dotted line position as indicated in Fig. 3. The bearing is then turned to lie in the plane of the stirrups and the bolt 32 is adjusted to apply closing pressure on the outer stirrup which will thus move towards the bearing unit forcing the bearing against the opposite stirrup and securing the bearings outer spherical surface within the conforming spherical surfaces of the stirrups.

It will be noted that the stirrup pieces 28 are identical in form and construction and are mounted for sliding fit within the housing 12. Therefore the contacting surfaces of the stirrups and body do not require accurate machining and the parts may be formed as simple castings and close tolerances between the stirrups and the recess of the housing are not required. The only machining operations necessary to produce the assembly are those for forming the inner spherical surfaces 29 of the stirrups and for boring and tapping the neck 16 of the body to receive the securing bolt 32. Moreover, in an assembly of the character set forth the finish of the engaging exterior surface of the race 38 of the bearing unit and the inner spherical surfaces 29 of the stirrups frequently need not be precise, particularly when the bearing unit is to be fixedly held in place between the companion stirrups during operation.

From the foregoing it will be seen that the present invention provides a simple and efficient bearing assembly embodying a limited number of parts capable of being economically produced. However, numerous changes and modifications may be resorted to without departure from the spirit or scope of the invention as outlined in the appended claims.

I claim:

1. A bearing assembly comprising a body in the form of a unitary casting having a circular bearing receiving opening therethrough, there being an annular recess extending about said opening and presenting marginal shoulders at opposite sides thereof, a pair of oppositely facing arcuate bearing retaining members located in said recess and held against twisting or end play with respect to said body by engagement thereof with said shoulders, said bearing retaining members presenting complementary inwardly facing concave spherical surfaces, a bearing unit located between said retaining members and presenting an outer spherical surface complementary therewith, said body having a rod extending therethrough into engagement with one of said retaining members at a point substantially midway between the ends thereof, means for adjusting said rod to move one of the retaining members toward said bearing unit, the other retaining member having an outwardly projecting portion thereon located opposite said rod and engaging a depression in said annular recess to prevent arcuate movement of the opposite retaining member.

2. A bearing assembly comprising a body in the form of a unitary casting having a circular bearing receiving opening therethrough, there being an annular recess extending about said opening and presenting marginal shoulders at opposite sides thereof, a pair of oppositely facing arcuate bearing retaining members located in said recess and held against twisting or end play with respect to said body by engagement thereof with said shoulders, said retaining members each having an outwardly projecting positioning boss engageable thereon, there being a depression in said recess receiving the boss on one of said retaining members and a bore in said body diametrically opposite said depression receiving the boss on the other retaining member, each bearing member having an inwardly facing concave spherical surface, a roller bearing assembly having an outer race with a convex spherical surface complementary to the concave spherical surfaces on said retaining members, a rod extending through said bore and engaging the boss of the retaining member adjacent thereto to adjust the position of the retaining member with respect to said bearing assembly, and means for securing said rod in adjusted position in said bore.

LEONHARD A. MAAS.

REFERENCES CITED

The following references are of record in the file of this patent:

UNITED STATES PATENTS

| Number | Name | Date |
|---|---|---|
| 1,227,774 | Friess | May 29, 1917 |
| 1,854,925 | Crawford | Apr. 19, 1932 |
| 1,883,782 | Graham | Oct. 18, 1932 |